US010958518B2

(12) United States Patent
Yu et al.

(10) Patent No.: US 10,958,518 B2
(45) Date of Patent: Mar. 23, 2021

(54) DYNAMIC SWITCHING BETWEEN HUB MODE AND SLAVE MODE

(71) Applicant: Lenovo (Singapore) Pte. Ltd., Singapore (SG)

(72) Inventors: Jonathan Jen-Wei Yu, Raleigh, NC (US); Russell Speight VanBlon, Raleigh, NC (US); Axel Ramirez Flores, Cary, NC (US); Aaron M. Stewart, Raleigh, NC (US); Mark Krynock, Raleigh, NC (US); Rodrigo Felix de Almeida, Raleigh, NC (US); Jonathan Co Lee, Cary, NC (US); James A. Hunt, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/369,687

(22) Filed: Mar. 29, 2019

(65) Prior Publication Data

US 2020/0313963 A1 Oct. 1, 2020

(51) Int. Cl.
*H04L 12/24* (2006.01)
*H04L 29/06* (2006.01)

(52) U.S. Cl.
CPC ...... *H04L 41/0816* (2013.01); *H04L 65/1093* (2013.01); *H04L 65/4038* (2013.01)

(58) Field of Classification Search
CPC ........ G06F 1/16; G06F 1/1632; G06F 1/1656; G06F 1/1698; G06F 13/00; G06Q 10/10; H04L 12/581; H04L 12/1822; H04L 29/06; H04L 29/06027; H04L 29/08072; H04L 12/1827; H04L 41/0816; H04L 65/403; H04L 65/1093; H04L 65/4038; H04L 67/00; H04L 12/24; H04N 7/15; H04N 7/142; H04N 7/147; H04N 7/148; H04N 7/152; H04N 2007/145; H04N 1/00352; H04N 7/08; H04N 7/14; H04N 7/141; H04N 7/157; H04N 9/68; H04N 9/77; H04N 9/643; H04M 1/02; H04M 1/04; H04M 1/0254; H04M 1/6033; H04M 1/7253; H04M 1/72522; H04M 1/72527; H04M 2250/52; H04M 3/56; H04M 3/566; H04M 3/567; H04M 11/066; H04M 2203/1041; A61B 5/0456
(Continued)

(56) References Cited

U.S. PATENT DOCUMENTS 5,508,713 A * 4/1996 Okouchi ............... G06F 3/0481
　　　　　　　　　　　　　　　　　　　345/2.2
9,178,918 B2 * 11/2015 Broadworth ........ H04L 12/1818
(Continued)

OTHER PUBLICATIONS

"Lenovo ThinkSmart Hub 500 Deployment Guide" (Version 0.15), pp. 1-21. Publication Date: Mar. 29, 2018.*
(Continued)

*Primary Examiner* — Robert B Harrell
(74) *Attorney, Agent, or Firm* — John M. Rogitz; John L. Rogitz

(57) ABSTRACT

In one aspect, a device includes at least one processor and storage accessible to the at least one processor. The storage includes instructions executable by the at least one processor to switch a hub device from a hub mode to a slave or pass-through mode responsive to one or more contextual triggers.

20 Claims, 7 Drawing Sheets

(58) Field of Classification Search
USPC ............ 348/14.08, 14.3; 455/556.1; 709/204
See application file for complete search history.

(56) References Cited

U.S. PATENT DOCUMENTS

| | | | |
|---|---|---|---|
| 9,258,523 B2* | 2/2016 | Sobti | H04N 7/15 |
| 9,900,556 B1* | 2/2018 | Scanlon | H04N 7/157 |
| 2008/0159507 A1* | 7/2008 | Virolainen | H04M 3/568 |
| | | | 379/202.01 |
| 2012/0173732 A1* | 7/2012 | Sullivan | G06F 1/183 |
| | | | 709/226 |
| 2013/0088564 A1* | 4/2013 | Hillier | H04N 7/15 |
| | | | 348/14.08 |
| 2013/0342638 A1* | 12/2013 | Sobti | G06F 1/1698 |
| | | | 348/14.08 |
| 2015/0035939 A1* | 2/2015 | Hillier | H04L 12/1822 |
| | | | 348/14.08 |
| 2017/0163788 A1* | 6/2017 | Andersen | H04N 7/142 |
| 2018/0063481 A1* | 3/2018 | Yu | H04N 7/15 |
| 2019/0222803 A1* | 7/2019 | Pather | H04N 21/42204 |

OTHER PUBLICATIONS

Chino, "Lenovo Revolutionizes Workspaces With the ThinkSmart Hub 500", pp. 1-4. Publication Date: Sep. 26, 2017.*
Amazon, "Lenovo 10V5000 US ThinkSmart Hub 500 10V5 11.6 All-in-one PC-8 GB RAM-128 GB SSD—Intel HD Graphics—Black", pp. 1-6, Download Date: Apr. 21, 2020.*

* cited by examiner

DYNAMIC SWITCHING BETWEEN HUB MODE AND SLAVE MODE

FIELD

The present application relates to technically inventive, non-routine solutions that are necessarily rooted in computer technology and that produce concrete technical improvements.

BACKGROUND

As recognized herein, hub devices permit screen sharing between multiple devices for, e.g., conference call purposes. As also understood herein, when only a single user is present where the hub device is located, there is no mechanism to dynamically change its mode of usage to a more appropriate mode.

There are currently no adequate solutions to the foregoing computer-related, technological problem.

SUMMARY

Accordingly, in one aspect a first device includes at least one processor and storage accessible to the processor and in turn including instructions executable by the processor to configure a computerized hub (CH) in a hub mode in which the CH accepts plural content feeds from direct wired connections and/or from at least one wireless source. The instructions are executable to, responsive to receipt of a first signal, configure the CH in a slave mode in which a client device assumes system control of the CH including internal computing components of the CH and all peripheral devices connected to the CH.

In some embodiments, the first device may include a display accessible to the processor.

Also in some embodiments, the CH may include at least one a high definition multimedia interface (HDMI) input port, plural HDMI output ports, plural universal serial bus (USB) ports, at least one Ethernet port, at least one microphone/audio jack, and/or at least one wireless transceiver for sending signals received wireless to the at least one processor.

Also in some embodiments, the first signal may be generated at least in part responsive to one or more of a voice command, receipt of a signal from manipulation of a key on the client device, and/or plugging into the CH one or more of: at least one universal serial bus (USB) connector, at least one high definition multimedia interface (HDMI) connector from the client device.

Furthermore, in some examples the instructions may be executable to identify that only one user is present with the CH in the hub mode and to configure the CH in the slave mode responsive to identifying that only one user is present. The instructions may be further executable to identify that plural client devices are connected to the CH with the CH in the slave mode and to automatically configure the CH to the hub mode responsive to identifying that plural client devices are connected to the CH.

Still further, the instructions may be executable to identify that a user is connected to a meeting with plural participants, none of which are connected to the CH, with the CH in the hub mode and to configure the CH in the slave mode responsive to identifying that a user is connected to a meeting with plural participants none of which are connected to the CH.

In another aspect, a method includes configuring a hub to accept plural content feeds from direct wired connections and/or from at least one wireless source. The method includes, responsive to receipt of a first signal, configuring the hub so that a client device assumes system control of the hub and peripheral devices connected to the hub.

In another aspect, a computer system includes a hub compute device (hub), at least two peripheral devices connected to the hub, and at least one client device connected to the hub to receive video from the peripheral devices in a hub mode and to control the hub and peripheral devices in a slave mode.

The details of present principles, both as to their structure and operation, can best be understood in reference to the accompanying drawings, in which like reference numerals refer to like parts, and in which:

DETAILED DESCRIPTION

Figure 1:
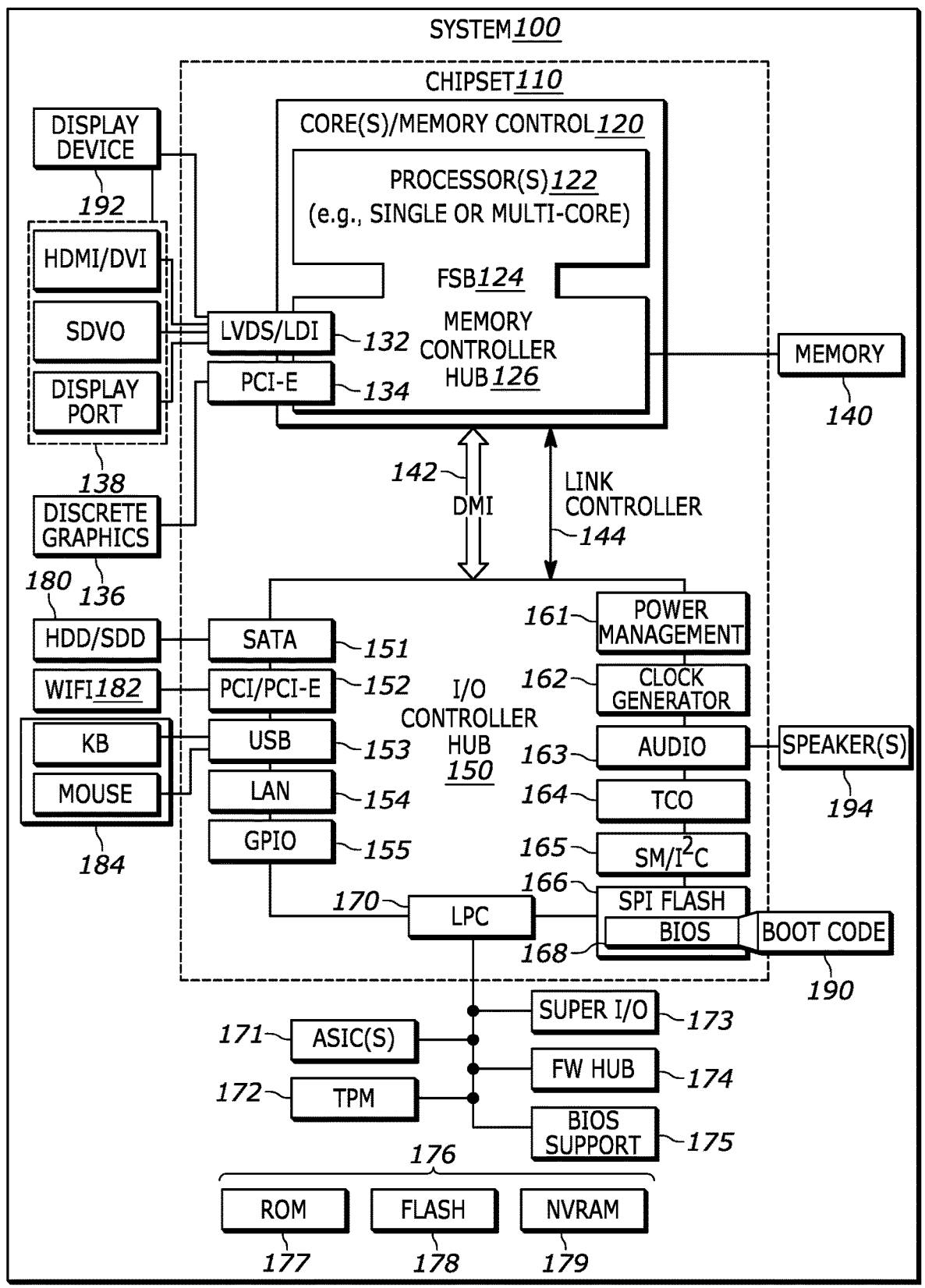
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system.

Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/ DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
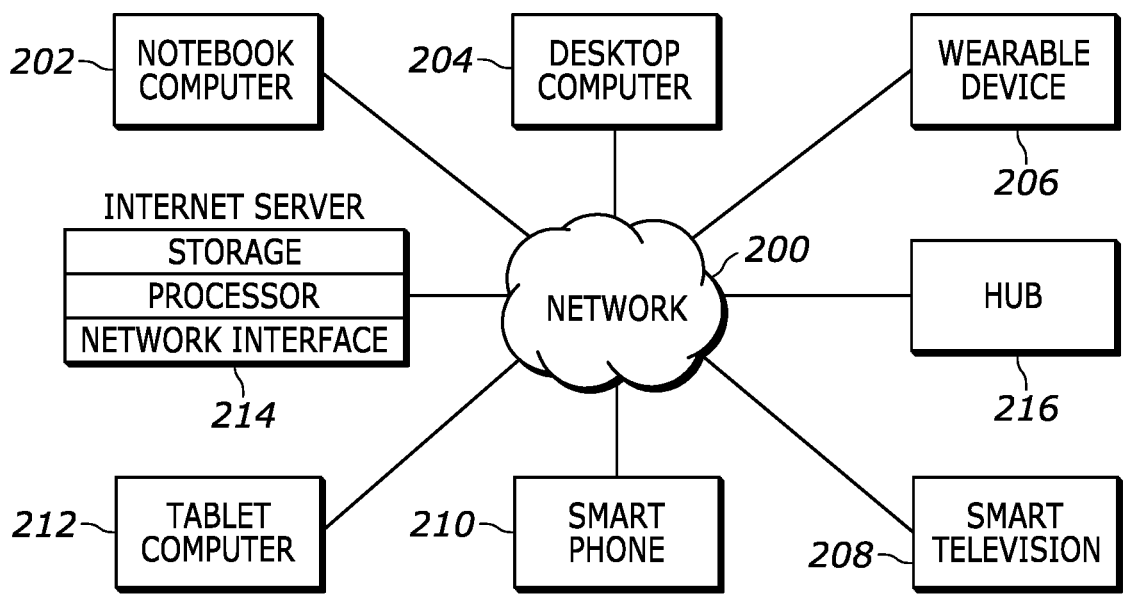
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. A hub computing device 2016 also may be provided as described further below. It is to be understood that the devices 202-216 are configured to communicate with each other over the network 200 to undertake present principles, and that the hub 216 may be directly connected to one or more of the devices shown in FIG. 2 for purposes to be shortly disclosed.

Figure 3:
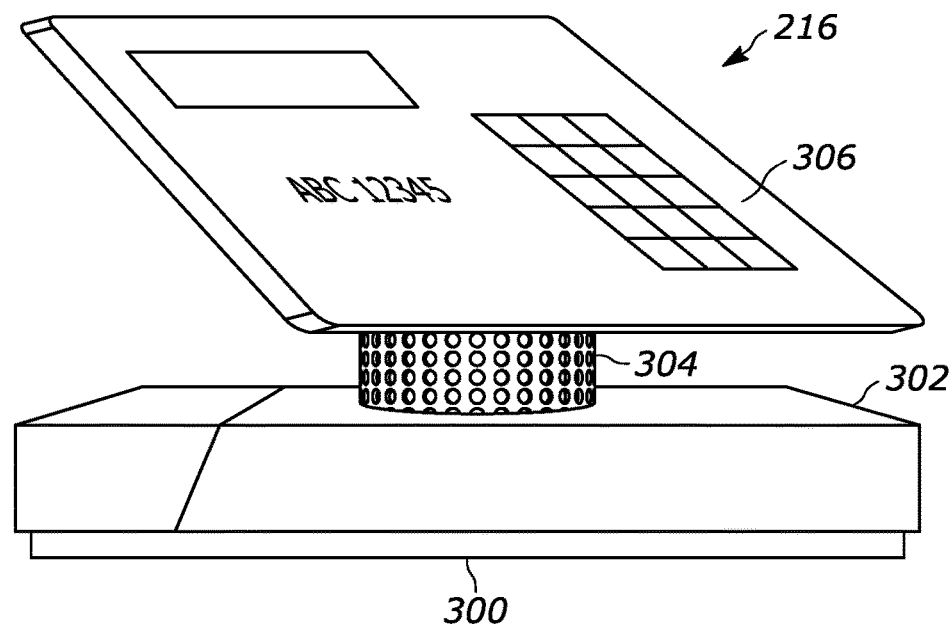
FIG. 3 is a perspective view of an example non-limiting hub device.
Figure 4:
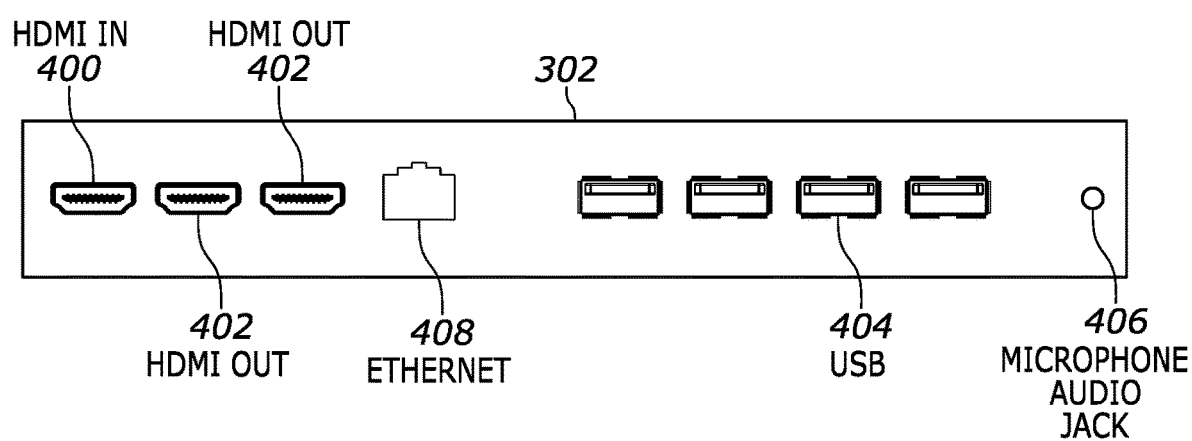
FIG. 4 is an elevational view of the connector portion of the hub device in FIG. 3.

FIG. 3 illustrates an example non-limiting hub 216 embodied as an assembly 300 that includes a component case 302 supporting a cylindrical speaker and/or microphone 304 on top of which a touch sensitive display 306 may be rotatably and/or tiltably mounted. In some embodiments, the display 306 may even present a settings graphical user interface (GUI) on which a graphical option/setting may be presented that may be selectable (via a check box, for example) to enable the hub 216 to undertake present principles, e.g., to undertake the logic set forth below with respect to FIGS. 8-11. As shown in FIG. 4, the component case 302 may include multiple input/output ports. In the example shown, the hub 300 includes a high definition multimedia interface (HDMI) input port 400, two HDMI output ports 402, four universal serial bus (USB) ports 404, a microphone/audio jack 406, and an Ethernet port 408.

Figure 5:
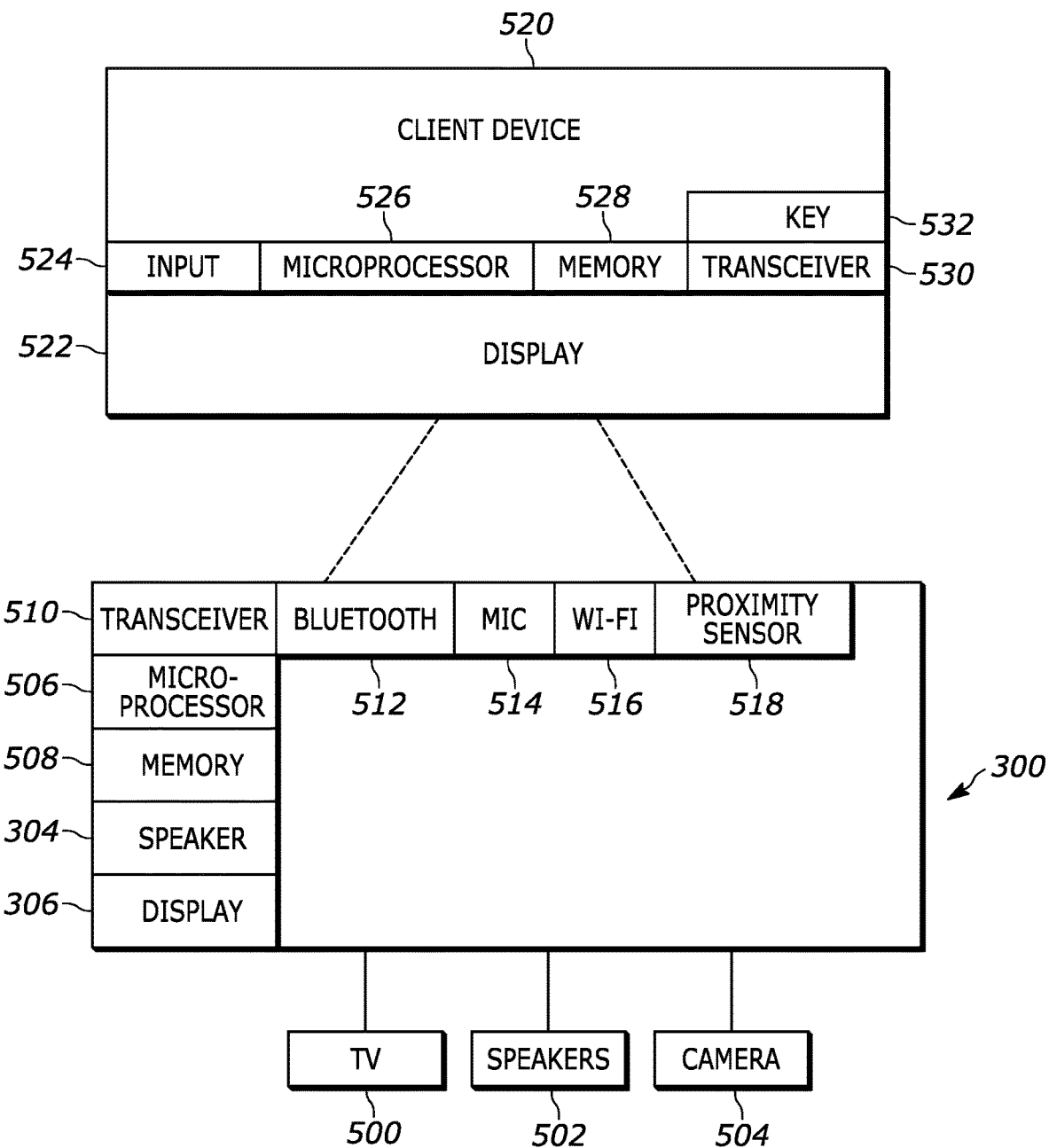
FIG. 5 is a block diagram of the hub device and certain connected components.

FIG. 5 shows that with the ports of FIG. 4, the hub 300 may execute input/output with multiple devices including a TV or other large screen display 500, an audio speaker system 502, and a still or video camera 504. FIG. 5 also shows certain example non-limiting internal components of the hub 300, in addition to the display 306 and speakers 304. One or more processors 506 may access data and instructions on one or more computer memories 508 and may communicate wireless with one or more transceivers 510, such as wireless telephony transceivers. The processor 506 may also communicate information through one or more Bluetooth transceivers 512, and may accept audio input from one or more microphones 514 such as but not limited to two far-field microphone arrays. Communication also may be established using one or more Wi-Fi transceivers 516. A proximity sensor 518 such as an infrared (IR) sensor also may be provided to sense humans nearby.

The hub 300 can connect to one or more client devices 520. In the example shown, the client device 520 is a computing device with one or more displays 522, one or more input device or devices 524 such as mice, keypads, microphones, and the like, and one or more processors 526 accessing one or more computer memories 528. The client device 520, in addition to being directly connected to the hub 300 using one of the ports shown in FIG. 4, may communicate with the hub 300 and/or with other devices using one or more wireless transceivers 530 such as any of the transceivers described herein. The client device 520 also may include one or more software or hardware keys 523 manipulable by a person for purposes to be shortly disclosed.

Figure 6:
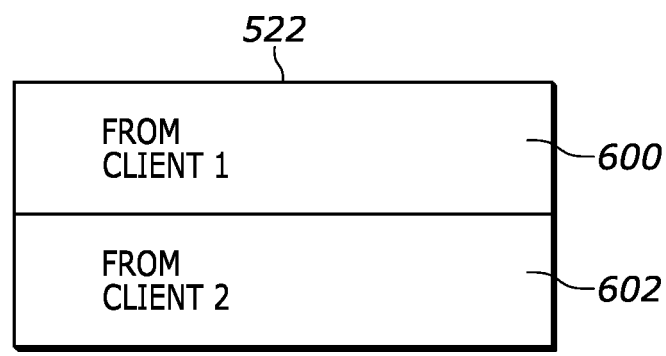
FIGS. 6 and 7 are screen shots of screen sharing in the hub mode.
Figure 7:
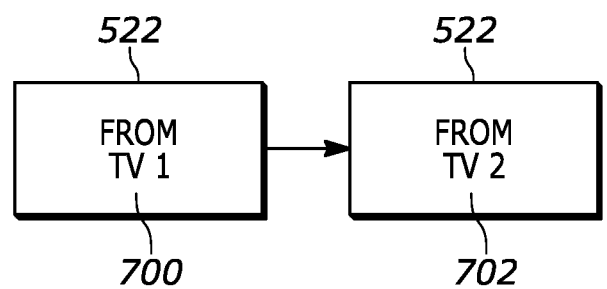

FIGS. 6 and 7 illustrate that in a hub mode, described more fully below, the hub 300 in a hub mode accepts audio/video feeds from other client devices. In the hub mode, the hub 300 accepts and plays back or otherwise presents multiple audio and video feeds from direct wired connections such as from the above-mentioned HDMI-input port in FIG. 4 and described above or other AN connector or via wireless WebRTC point-to-point casting via one or more of the transceivers shown in FIG. 5 and described above. Hub mode allows for multiple screens to be displayed onto, for example, the display 522 of the client device shown in FIG. 5 or the display of the TV 500 shown in FIG. 5 either in multi-window layouts such as shown in FIG. 6, in which a display presents video from two devices at once, or serially as shown in FIG. 7, in which a display presents video from only a single device at once and transitions to presentation from one device input to another device input.

Figure 8:
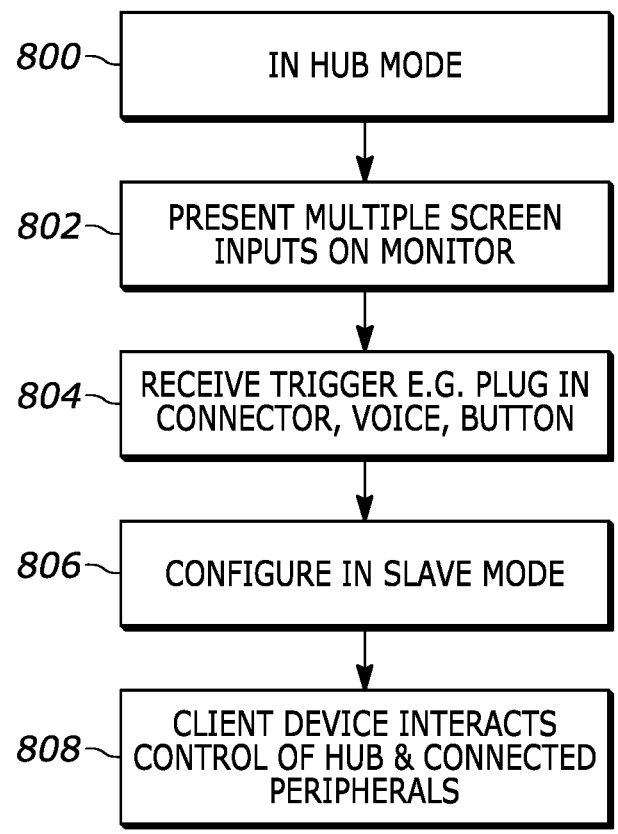
FIG. 8 is a flow chart of an example algorithm consistent with present principles for switching from hub mode to slave (or "pass-through") mode.

Referring now to FIG. 8, assume that the hub consistent with present principles is in the hub mode at block 800. Input from multiple sources are presented on a display at block 802 as described above. Moving to block 804, a trigger is received, such as one or more of plugging in USB and HDMI connectors from a client device such as the client device 520 shown in FIG. 5, a voice command, and receipt of a signal from manipulation of the hardware or software key 532 in FIG. 5, for instance.

Responsive to the trigger, the logic moves to block 806 to configure the hub in a slave (or "pass-through") mode. In the slave mode and as indicated at block 808 in FIG. 8, the client device 520 inherits system control of the hub 300 including if desired its internal computing components and all peripheral devices connected to the hub, such as the TV 500, speakers 502, camera 504, and other accessories. When in the slave (or "pass-through") mode, the hub 300 becomes an extension or "docking" for the client device 520.

By enabling these modes, users are able to leverage the hardware and onboard software of the hub 300 for collaboration in the hub mode, whereas when in the slave (or "pass-through") mode, only one device can control and share content.

Figure 9:
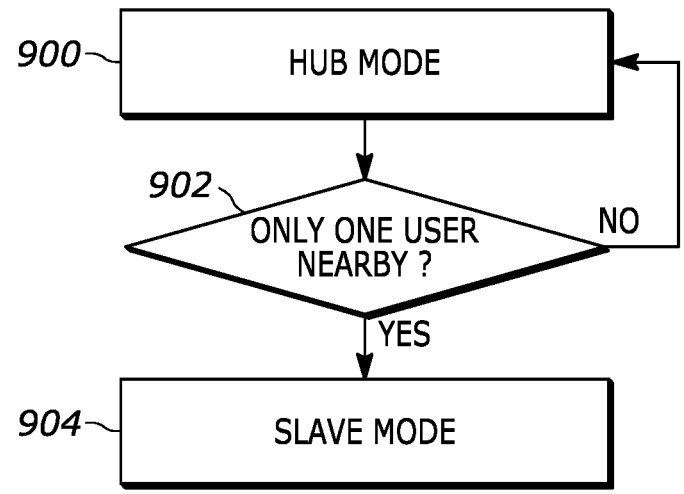
FIG. 9 is a flow chart of an alternate example algorithm consistent with present principles for switching from hub mode to slave (or "pass-through") mode.

FIG. 9 illustrates that in the hub mode at block 900, detecting the intended mode may include analysis of the number of detected devices nearby. If it is determined at diamond 902 that only one person is detected nearby, e.g., by the proximity sensor 518 shown in FIG. 5, it is likely that user is working alone and would use the device in the slave (or "pass-through") mode, which is accordingly switched to at block 904.

Figure 10:
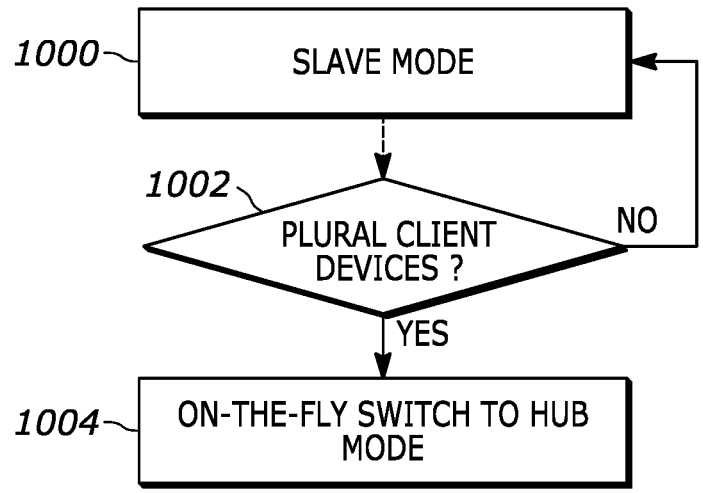
FIG. 10 is a flow chart of an example algorithm consistent with present principles for switching from slave (or "pass-through") mode to hub mode.

On the other hand, FIG. 10 illustrates that with the hub in the slave mode at state 1000, if it is determined at diamond 1002 that plural client devices (local or remote) are connected to the hub 300, the hub switches on-the-fly to the hub mode at block 1004.

Figure 11:
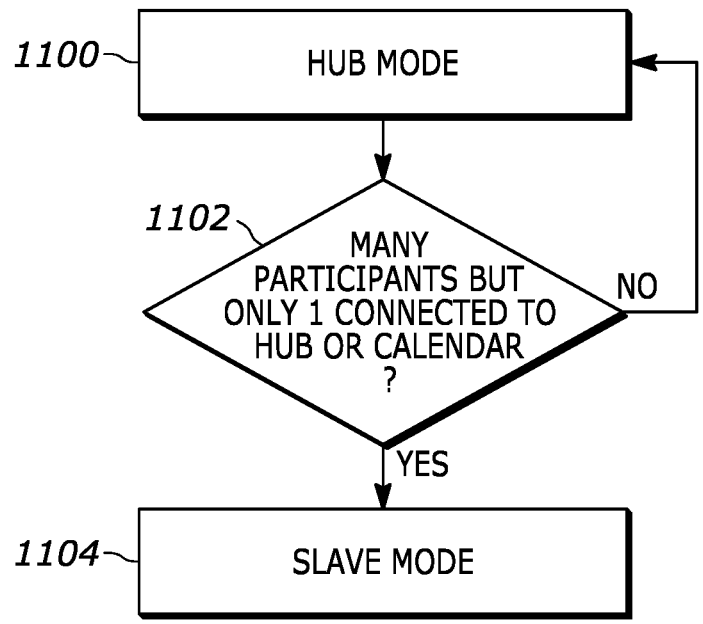
FIG. 11 is a flow chart of an alternate example algorithm consistent with present principles for switching from hub mode to slave (or "pass-through") mode.

FIG. 11 illustrates that an electronically-stored calendar may be used for dynamic detection/switching. Assume that with the hub in the hub mode at state 1100, it is determined at state 1102 that a user is connected to a meeting with many participants, but none of those participants are connected to that hub (or calendar event), implying the appropriateness of use of the hub as a slave rather than in the hub mode. In such a case, the hub switches to slave mode at state 1104.

Note that while certain figures illustrate logic in flow chart format, state logic or other equivalent logic may be used.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A method comprising:
    configuring a hub in a first mode to accept different content feeds from different devices other than the hub;
    with the hub in the first mode, identifying based on data in an electronically-stored calendar that a user is connected to a meeting with plural participants none of which are connected to the hub; and
    while in the first mode and responsive to identifying that the user is connected to the meeting with plural participants none of which are connected to the hub, configuring the hub in a second mode in which a client device assumes system control of the hub and one or more peripheral devices connected to the hub, the second mode being different from the first mode, the client device being different from the hub.

2. The method of claim 1, comprising:
    while in the first mode, concurrently presenting the different content feeds on a display controlled by the hub.

3. The method of claim 2, wherein the different devices comprise first and second devices, and wherein the display forms part of a third device different from the first and second devices and different from the hub.

4. The method of claim 1, comprising:
while in the first mode and responsive to receipt of at least one signal, configuring the hub in the second mode, wherein the at least one signal is generated at least in part by a voice command.

5. The method of claim 1, comprising:
while in the first mode and responsive to receipt of at least one signal, configuring the hub in the second mode, wherein the at least one signal is generated at least in part by one or more of:
plugging into the hub one or more of at least one universal serial bus (USB) connector and/or at least one high definition multimedia interface (HDMI) connector from the client device; and
receipt of a signal from manipulation of a key on the client device.

6. The method of claim 1, comprising:
with the hub in the first mode, identifying that only one user is present based on input from an infrared (IR) proximity sensor; and
responsive to identifying that only one user is present, configuring the hub in the second mode.

7. The method of claim 1, comprising:
with the hub in the second mode, identifying that plural client devices are connected to the hub; and
responsive to identifying that plural client devices are connected to the hub, automatically configuring the hub in the first mode.

8. The method of claim 1, comprising:
while in the first mode, serially presenting the different content feeds on a display controlled by the hub.

9. An apparatus, comprising:
at least one processor;
storage accessible to the at least one processor and comprising instructions executable by the at least one processor to:
configure a computerized hub (CH) in a hub mode in which the CH accepts a first content feed from a first device and a second content feed from a second device, the first device being different from the second device, the first and second devices both being different from the CH, the first content feed being different from the second content feed, the first and second content feeds being received using direct wired connections and/or wireless communication;
while the CH is in the hub mode, present the first and second content feeds concurrently;
while the CH is in the hub mode and responsive to receipt of at least one signal, configure the CH in a slave mode in which a client device assumes system control of the CH including assuming control of one or more internal computing components of the CH and/or assuming control of one or more peripheral devices connected to the CH, the CH configured in the slave mode responsive to identifying based on data in an electronically-stored calendar that a user is connected to a meeting with plural participants none of which are connected to the CH.

10. The apparatus of claim 9, wherein the CH comprises:
at least one wireless transceiver for sending signals received wireless to the at least one processor.

11. The apparatus of claim 9, wherein the instructions are executable to:
configure the CH in the slave mode responsive to a voice command.

12. The apparatus of claim 9, wherein the instructions are executable to configure the CH in the slave mode responsive to both of:
plugging into the CH one or more of at least one universal serial bus (USB) connector, at least one high definition multimedia interface (HDMI) connector from the client device; and
receipt of a signal from manipulation of a key on the client device.

13. The apparatus of claim 9, wherein the instructions are executable to:
with the CH in the hub mode and based on input from an infrared (IR) proximity sensor on the CH, identify that only one user is present; and
responsive to identifying that only one user is present, configure the CH in the slave mode.

14. The apparatus of claim 9, wherein the instructions are executable to:
with the CH in the slave mode, identify that plural client devices are connected to the CH; and
responsive to identifying that plural client devices are connected to the CH, automatically configure the CH to the hub mode.

15. The apparatus of claim 9, wherein the apparatus comprises the CH.

16. The apparatus of claim 9, wherein the first and second content feeds are presented concurrently on a television different from the first device, second device, and CH.

17. The apparatus of claim 9, wherein the client device is one of the first and second devices.

18. A computer system comprising:
a hub compute device (hub);
at least one peripheral device connected to the hub;
at least a first client device connected to the hub to control the hub and the at least one peripheral device in a slave mode and to share, with a second client device, control of the at least one peripheral device in a hub mode, wherein the hub, the at least one peripheral device, the first client device, and the second client device are all different from each other; and
storage accessible to at least one processor and comprising instructions executable by the at least one processor to:
dynamically switch between the hub mode and the slave mode responsive to one or more triggers at least such that the hub is placed in the slave mode responsive to identifying based on data in an electronically-stored calendar that a user is connected to a meeting with plural participants none of which are connected to the hub.

19. The computer system of claim 18, wherein the instructions are executable to:
while the hub is in the hub mode, serially present first and second content feeds respectively from the first and second client devices on a display controlled by the hub.

20. The computer system of claim 18, wherein the instructions are executable to:
dynamically switch between the hub mode and the slave mode responsive to voice commands, the voice commands at least in part establishing the one or more triggers.

* * * * *